United States Patent Office 3,096,171
Patented July 2, 1963

3,096,171
PROCESS FOR PREPARING SLOW RELEASE FERTILIZER COMPOSITION
Clarence J. Woerther, Lakeland, Fla., assignor to International Minerals & Chemical Corporation, a corporation of New York
No Drawing. Filed Oct. 10, 1960, Ser. No. 61,341
1 Claim. (Cl. 71—64)

The present invention generally relates to a novel fertilizer and to the manufacture of granular fertilizers. More particularly, the invention relates to a novel granular fertilizer having gradual plant nutrient release properties and to a method for the preparation thereof.

Granular fertilizers and fertilizer ingredients are in high demand and generally command a premium price as compared to the more finely divided materials. The granular fertilizers and fertilizer ingredients are desirable because they have less tendency to cake, are easier to apply and losses from strong winds during field application are decreased.

One of the disadvantages inherent in many fertilizers, including granular fertilizers, sold commercially heretofore is that a substantial portion of the plant nutrients in these fertilizers, particularly nitrogen, is solubilized in the soil more rapidly than the plants can utilize these nutrients. Water soluble nitrogen can migrate and may be washed away from the root zone. As a result, it is necessary to make several applications of fertilizer to the soil during the growing period of the plant, thereby substantially increasing the cost of producing the crop.

In more recent times, urea formaldehyde resin has been used as a component of fertilizers since a substantial portion of the nitrogen present in urea formaldehyde resins is relatively insoluble in cold water. As a result, when urea formaldehyde is applied to soils, a substantial portion of the nitrogen is slowly and uniformly available to the plant during the entire growing season. Urea formaldehyde resin is, however, a relatively expensive source of plant nitrogen. The more soluble forms of plant nitrogen such as urea, ammonia, ammonium nitrate, ammonium sulfate, etc., are generally much cheaper on a per pound of nitrogen basis and for this reason it is preferable to use these more soluble forms of nitrogen in fertilizers.

Further, while the nitrogen may be provided in a slowly soluble form, slowly soluble forms of phosphorus and potassium are not readily available at attractive prices. For this reason the phosphorus and potash in fertilizers is generally in relatively rapidly water soluble form.

It is an object of the present invention to provide a novel fertilizer composition having improved plant nutrient release properties.

It is a further object of the invention to provide a novel method of producing a granular fertilizer composition having improved plant nutrient release properties.

It is another object of the invention to provide a novel fertilizer composition having improved plant nutrient release properties, said fertilizer composition containing relatively water soluble compounds of nitrogen, phosphorus and/or potassium, and a plant wax.

It is an additional object of the invention to provide a novel method of producing a novel granular fertilizer composition having improved plant nutrient release properties from a plant wax and a relatively water soluble compound of nitrogen, phosphorus and/or potassium.

These and other objects and advantages of the invention will be apparent from the description of the invention.

Generally described, the novel composition of the present invention comprises a relatively water soluble compound of a plant nutrient and a plant wax.

It is well known that nitrogen, phosphorus and potassium are plant nutrients essential to plant growth. In the novel composition of this invention, one or more of these plant nutrients are provided as relatively water soluble compounds. Relatively water soluble nitrogen compounds include, inter alia, urea, potassium nitrate, ammonia, ammonium nitrate, ammonium sulfate, ammonium phosphate, and other ammonium and nitrate salts. Relatively water soluble phosphorus compounds include, inter alia, phosphoric acid, monocalcium phosphate, dicalcium phosphate, ammonium phosphate, potassium phosphate, superphosphate, triple superphosphate, etc. Relatively water soluble potassium compounds include, inter alia, potassium chloride, potassium carbonate, potassium sulfate, potassium phosphate, langbeinite, and the like.

A plant wax is another essential ingredient of the composition of the present invention. The outer wall of the epidermis of an adult plant leaf is thickened by the deposition of waxy cutin, a fatty substance highly impermeable to water. This waxy cutin, or plant wax, retards the egress of water from leaves and greatly reduces the transpiration. Many plant waxes are recovered on a commercial scale. Various methods of recovery of the plant waxes may be found in the prior art. The method of recovery of the plant waxes, however, forms no part of the present invention and is not further described.

Suitable plant waxes are, inter alia, palm wax, such as carnauba wax; waxes of herbs and shrubs, such as candelilla wax, flax wax, and cotton wax; and waxes of grasses and sedges, such as sugar-cane wax. Of these plant waxes, sugar-cane wax is specifically preferred since it is indicated that this wax is highly compatible with soil and that it nourishes some of the desirable soil organisms. It is, however, indicated that all of the plant waxes are compatible with the constituents in soil. This is an important feature of the invention since, of course, the plant wax is being used in a fertilizer composition which is to be applied to the soil.

The plant waxes are highly impermeable to water; therefore, when the plant wax is applied to a water soluble plant nutrient compound, the plant nutrient becomes less soluble. When such a composite is applied to the soil, the plant nutrient is, therefore, solubilized in water at a slower rate, thereby releasing the nutrient to the plant over a longer period of time. Mixtures of plant waxes may also be used. The amount of plant wax is preferably within the range of from about 0.1% to about 25% by weight of the composite and preferably from 0.2% to 10% by weight. Amounts of wax below 0.1% by weight do not substantially change the rate of water solubility. Amounts over 25% are generally uneconomical.

The plant wax may be applied to, coated on, or impregnated into a plant nutrient compound or to a mixture of plant nutrient compounds in any suitable manner. The plant wax may be molten or in solution or in emulsion form and sprayed onto the fertilizer ingredients or may be coated on the particles by a brush applicator, etc. The fertilizer ingredients may be dipped into molten plant wax, or a solution or emulsion of a plant wax, or the fertilizer ingredients may be mixed with particles of solid plant wax with the plant wax rubbing off onto the surface of the fertilizer ingredients. In any event, the plant wax is incorporated into the fertilizer composition and renders the water soluble plant nutrients more slowly available.

As hereinbefore set forth, granular fertilizers and fertilizer ingredients are preferred. The plant wax is, therefore, preferably composited with granular fertilizer ingredients. When the fertilizer ingredients are not in granular form they may be granulated or agglomerated first and then composited with the plant wax.

A preferred method of preparing a granular material from finely divided material in accordance with the present invention is to effect the granulation with the plant wax as the granulating aid or binder. In prior art granulation processes the finely divided materials were usually granulated with water as a granulating aid. The granules then had to be dried. Granules prepared in accordance with the prior art processes may, of course, be composited with a plant wax to provide the novel composition of this invention. In the process of the present invention, however, the granulating and compositing with the plant wax are effected simultaneously, thereby providing a more economical process. In the granulation process of this invention a molten plant wax is preferably used as the granulating aid. While a plant wax is essential in the novel composition of this invention, other waxes, such as petroleum wax, may be used in the novel process of this invention.

The granulation of the finely divided fertilizer material with the waxy material may be effected in any suitable manner. In a preferred method, a pan granulator is used. In a pan granulation the finely divided fertilizer ingredients are rolled around on a rotating pan. The wax may be applied to the pan in molten form and as the fertilizer ingredients roll over the molten wax, the molten wax will coat the particles and effect agglomeration or granulation. The resultant substantially spherical particles produced in the pan granulation will be coated with the wax due to rolling of the spheres in the pan granulation. The granules provided in this process have desirable physical characteristics such as high crushing strength and low dusting tendencies.

The novel composite of fertilizer ingredient and plant wax has advantages other than decreasing the rate at which the plant nutrient is released. The novel composition has better flow characteristics, it absorbs less moisture from the atmosphere and, therefore, has less caking tendency.

Fertilizer ingredients other than nitrogen, phosphorus, and/or potassium may be included in the fertilizer composition such as, for example, sulfur, magnesium, minor elements, etc. Pesticides, insecticides as well as selective herbicides may also be included in the fertilizer composition of this invention when desired.

In order to give a fuller understanding of the invention, but with no intention to be limited thereto, the following specific examples are given.

*Example I*

A 16-4-8 fertilizer was prepared by mixing the following materials.

| Parts by weight | Material | Analysis |
| --- | --- | --- |
| 450.4 | Normal Superphosphate | 18.65% $P_2O_5$. |
| 576.0 | Ammonium Nitrate | 33.5% N. |
| 544.6 | Ammonium Sulfate | 20.5% N. |
| 24.0 | Anhydrous Ammonia | 82.2% N. |
| 4.2 | Water | |
| 100.0 | Sulfate of Potash Magnesia | 21.5% $K_2O$; 18.5% MgO. |
| 228.9 | Muriate of Potash | 60.5% $K_2O$. |
| 60.0 | Minor Element Mixture | |

A portion of this fertilizer mixture was ball milled to produce a finely divided, dusty, uniform mixture having the following size analysis.

Mesh size: Percent by weight
+6 ---
−6 +14 ------ 1.0
−14 +35 ------ 13.8
−35 +100 ------ 65.2
−100 ------ 20.0

A portion of the ball milled material was granulated with water in a half liter size rotary granulator. The granules were then dried in the granulator by heating to about 180° F.

While the granules were at this temperature, 2% by weight of melted paraffin wax was added and well mixed in the granulator. The source of heat was removed and the material was cooled to room temperature while still being mixed in the granulator.

Another portion of the ball milled material was treated in substantially the same way except that 2% by weight of sugar-cane wax was used instead of the paraffin wax.

A portion of each of the wax coated fertilizers was tested to determine the percent by weight of cold water insoluble nitrogen. The sugar-cane wax treated fertilizer contained 4.1% by weight more cold water insoluble nitrogen than the paraffin wax treated fertilizer.

A third portion of the ball milled material was granulated as were the other portions except no wax was added to the granulator. The sugar-cane wax treated material contained 10.7% by weight more cold water insoluble nitrogen than the untreated material.

This example clearly illustrates that the nitrogen in a sugar-cane wax treated fertilizer is not as readily soluble in water as untreated fertilizer.

*Example II*

Another portion of the dusty 16-4-8 ball milled material was granulated on a pan granulator using sugar-cane wax as the granulating medium. The granulator was rotated at 24 r.p.m. and while it was rotating 7.5% by weight of molten sugar-cane wax was poured onto the pan.

Granulation of the finely divided material was effected. The size analysis of the dusty feed and of the substantially dust free granulated product were as follows:

| Mesh Size | Percent By Weight | |
| --- | --- | --- |
| | Feed | Product |
| +6 | | 0.7 |
| −6 +14 | | 4.4 |
| −14 +35 | 1.0 | 24.3 |
| −35 +100 | 13.8 | 59.6 |
| −100 | 65.2 | 11.0 |
| | 20.0 | |

The above results clearly show that a substantial degree of granulating was achieved when following the process of this invention.

The granules had desirable physical characteristics. Further whereas the ball milled feed was dusty, the product was substantially dust free.

The description of the invention utilized specific reference to certain process details; however, it is to be understood that such details are illustrative only and not by way of limitation. Other modifications and equivalents of the invention will be apparent to those skilled in the art from the foregoing description.

I claim:

A process for preparing a fertilizer composition compatible with the constituents in soil and which when applied to soil releases the plant nutrient over an extended period of time, said fertilizer composition containing a water-soluble plant nutrient compound and a plant wax, said process comprising the steps of coating particles of a relatively water-soluble plant nutrient compound selected from the group consisting of urea, potassium nitrate, ammonium nitrate, ammonium sulfate, ammonium phosphate, dicalcium phosphate, potassium phosphate, superphosphate, triple superphosphate, potassium chloride, potassium carbonate, potassium sulfate, langbeinite and mixtures thereof, with from about 0.1% to about 25% by weight of said fertilizer composition of waxy cutin plant wax, and recovering said coated particles, whereby the water-soluble plant nutrient compound in said particle is rendered soluble in water at a relatively slower rate.

References Cited in the file of this patent

UNITED STATES PATENTS

| | | |
|---|---|---|
| 1,863,157 | Geere | June 14, 1932 |
| 2,005,944 | Malischev | June 25, 1935 |
| 2,399,987 | Cordie et al. | May 7, 1946 |
| 2,580,653 | Bridgeman | Jan. 1, 1952 |

OTHER REFERENCES

Industrial and Engineering Chem., "Production of Grained Ammonium Nitrate Fertilizer," Miller et al., July 1946, vol. 38, No. 7, pages 709–718.